United States Patent Office 2,770,608
Patented Nov. 13, 1956

2,770,608

POLYETHYLENE COMPOSITION

Harold C. Barker, Wilmington, Del., Ernest E. Lewis, Chadds Ford, Pa., and William B. Happoldt, Jr., Claymont, Del., assignors to E. I. du Pont de Nemours and Company, Wilmington, Del., a corporation of Delaware No Drawing. Application October 12, 1954,
Serial No. 461,908

9 Claims. (Cl. 260—32.6)

This invention relates to a plastic composition of matter, and more particularly to a polyethylene composition and articles made therefrom having improved properties with respect to blocking and coefficient of friction.

It has been known for some time that one of the major drawbacks of thin films of polyethylene is a high film-to-film coefficient of friction, which often prevents the feeding of single sheets to automatic packaging equipment. Another disadvantage of thin polyethylene films is the tendency for these films to block. Blocking is the adherence of two or more film surfaces to each other while stacked under pressure. In the manufacture of blown polyethylene film, for example, this blocking phenomenon manifests itself, after forming a tube of film, slitting and reeling up the collapsed tube, in the adherence of the inner surfaces of the polyethylene tube to each other, making it difficult if not impossible to open the tube.

An object of this invention is to provide a plastic composition based on polyethylene which possesses markedly reduced film-to-film coefficient of friction. Another object is to provide a polyethylene composition which upon conversion into sheets and films possesses greatly improved resistance to blocking. A further object is to provide an improved polyethylene composition with respect to blocking and coefficient of friction without adversely affecting other properties of films made therefrom, such as transparency, haze, vapor permeability, and the like. Other objects will be apparent from the description of the invention given below.

This invention provides a plastic composition comprising polyethylene and a small amount of a fatty acid amide containing from 12 to 16 carbon atoms inclusive or mixture thereof. Another modification of the invention provides articles made from the above polyethylene compositions in the form of films, sheets, tubes, coatings, and other formed structures having lower blocking tendencies and lower coefficients of friction.

The composition may be prepared by any method suitable for insuring a uniform mixture of polyethylene and additives in the final fabricated article. Suitable methods include addition of the amide as a solid, in solution, or in the form of a slurry in water or other non-solvent, to the polyethylene in either the dry fluff or molding powder form followed by drying and tumbling. The amide may also be incorporated in the polyethylene by melt blending the ingredients in conventional apparatus, such as a Banbury mixer, heated rolls, or a plasticator. A concentrate of the amide in polyethylene can be made by one of the aforesaid methods and this in turn can be blended with polyethylene molding powder by tumbling or other suitable means. Finally, various combinations of the above methods can be used.

In general the proportion of fatty acid amide used in polyethylene to achieve any significant reduction in the coefficient of friction must be at least 0.01% by weight of the polyethylene. Increasing amounts of the amide will, of course, further reduce that coefficient. Usually there will be no particular advantage of employing amounts greater than 0.5% of the amide by weight of the polyethylene, and it is preferred to use between 0.025% and 0.075%.

The discovery that certain saturated fatty acid amides were specific in their ability to reduce the film-to-film coefficient of friction of polyethylene was most surprising. Of those amides it was found that those having less than 10 carbon atoms per molecule are of no particular value because they do not prevent blocking. Moreover, those having more than 16 carbon atoms do not exude to a sufficient extent or otherwise act to reduce the film-to-film coefficient of friction for polyethylene. Furthermore, of the group of saturated fatty acid amides, preferably primary and unsubstituted, containing from 10 to 16 carbon atoms in the acid group, the invention is particularly based on the use of palmitamide and myristamide because of their superior ability to reduce film-to-film coefficient of friction of polyethylene.

The chief advantage of the polyethylene compositions containing the amides above described is that these compositions allow the production of transparent polyethylene films, tubes, and other shaped articles having greatly reduced film-to-film coefficient of friction. Another advantage achieved by the polymer compositions of the invention is that they exhibit not only reduced film-to-film coefficient of friction and reduced tendency toward blocking, but also improved antistatic qualities without significantly altering the superior film draw rate, transparency, haze, vapor permeability, and heat sealability of polyethylene.

Although the compositions of this invention are composed essentially of polyethylene containing small amounts of specific amides, the compositions may also contain small amounts of other desirable additives, such as high melting waxes, antioxidants for the polyethylene, dyes and pigments for coloring the polyethylene, lubricants, antistatic agents, and the like, provided the additional ingredients are not present in amounts sufficient to alter the efficacy of the amide.

It has been found that the addition of fatty acid amides of this invention to polyethylene is effective in markedly reducing the film-to-film coefficient of friction of all of several different solid polyethylenes tested, regardless of the molecular weight or crystallinity of the particular polyethylene.

The polyethylene compositions herein disclosed and claimed are particularly useful for fabrication by extrusion into thin films, sheets, blown tubing, and the like. The compositions may also be cast, extruded, or molded into films, sheets, rods, tubes and piping, filaments, and other shaped articles. The compositions may also be used for coating paper, cloth, wire, metal foil, glass fiber mats, synthetic and natural textiles, and other substrates.

The following example illustrates specific embodiments of this invention. All parts are given by weight unless otherwise specified.

This example illustrates the effect of the fatty acid amides in reducing the film-to-film coefficient of friction of polyethylene. The indicated amounts of the amide and other modifiers given in Table I were incorporated in commercially available samples of polyethylene having a number average molecular weight of 26,000–30,000 (determined by measuring the viscosity of dilute solutions in xylene according to Harris, J. of Polymer Science 8, 353 (1952)) by dissolving them in enough methylene chloride to give approximately a 10% solution, and adding this solution as a fine stream to polyethylene molding powder in a double ribbon horizontal blender with constant blending. Blending was continued for about 15 minutes, after which no odor of methylene chloride remained due to evaporation, and the samples appeared to be homogeneous. The blended compositions were then extruded into flat film by forcing them through a standard plastics extrusion machine having a die temperature of 280° C., or by extruding the compositions into blown tubing at a temperature of 170° C., which was then slit to flat film. The extruded film was then tested for its tendency to block by measuring the adherence of two film surfaces to each other after standing under pressure.

The test used to measure the blocking property of films, results from which are tabulated below, is principally qualitative. The degree of cohesion between films is determined on a relative scale after the films have been in contact with each other under pressure. Film, 2 mils in thickness, is cut into 2" x 2" squares; squares with similar surfaces together are placed between blotting paper squares of same size; a number of pairs being stacked to obtain average values. The stack is then placed in a press, pressure of 100 p. s. i. applied for 1–3 seconds; the pressure reduced and the stack removed for immediate examination (which is conducted in the following manner), and the grade determined:

GRADE 1

Remove top square of blotting paper. Using sharp pointed object, try to slide the top film square laterally over the matching square directly beneath it by pushing on the one corner of the upper square. If the upper square slides freely, the film is block-free and Grade 1.

GRADE 2

If the upper square fails to slide freely, grasp one corner of the upper square with tweezers and lift slowly and smoothly vertically—keeping the tweezer points always directly above the peel line between the two squares. If the upper square peels free of the lower square in this manner, the blocking is considered Grade 2.

GRADE 3

Should the lower square remain stuck to the upper square after the Grade 2 procedure, continue to hold the two squares by the corner of one with the tweezers, with squares in the vertical plane. With a penknife blade, try to assist separation of the two squares by forcibly separating about ⅓ of the upper common area. If the squares then separate of their own accord, consider the film as Grade 3.

GRADE 4

If the film squares do not separate in the Grade 3 test, it should be considered as Grade 4.

Table.—Properties of flat film [1] made from polyethylene [2] containing long chain fatty acid amides

| Additive | Percent | Coeff. of Frict. | Blocking F. D. Test | Trans., Percent Std. |
|---|---|---|---|---|
| Lauramide | 0.2 | 0.53 | 1 | 366 |
| Myristamide | 0.025 | 0.83 | 1 | 433 |
| Do | 0.05 | 0.73 | 1 | 466 |
| Do | 0.1 | 0.56 | 1 | 466 |
| Do | 0.2 | 0.46 | 1 | 466 |
| Palmitamide | 0.025 | 0.86 | 2 | 400 |
| Do | 0.05 | 0.70 | 1 | 320 |
| Do | 0.1 | 0.53 | 1 | 466 |
| Do | 0.2 | 0.50 | 1 | 466 |
| None | | 1.2 | 4 | 466 |

[1] 2 mil film, melt temp. 250° C., 30 ft./min. take-off, 20° C. quench.
[2] "Alathon" 10, lot #411017; density 0.922, M. I. 2.15.

The compositions of the invention have many important uses which relate principally to the ease of separating contacting surfaces of polyethylene. These surfaces may be flat, as in a stack of sheets, roll of film, articles or other shapes as in granules, or other forms of the polymer which, in the absence of the additives of the invention, would adhere.

We claim:

1. A plastic composition comprising solid polyethylene and 0.1% to 0.5% by weight of an amide having the formula

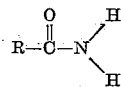

in which

is the acyl radical of a saturated fatty acid containing 10 to 16 carbon atoms, based on the weight of polyethylene.

2. A plastic composition comprising polyethylene and 0.01% to 0.5% by weight of a saturated primary fatty acid amide containing from 10 to 16 carbon atoms inclusive.

3. A plastic composition comprising polyethylene and 0.025% to 0.075% by weight of a saturated primary fatty acid amide containing from 10 to 16 carbon atoms inclusive.

4. A plastic composition comprising polyethylene and 0.01% to 0.5% by weight of palmitamide.

5. A plastic composition comprising polyethylene and 0.01% to 0.5% by weight of myristamide.

6. A plastic film comprising solid polyethylene and 0.1% to 0.5% by weight of an amide having the formula

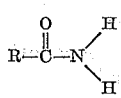

in which

is the acyl radical of a saturated fatty acid containing 10 to 16 carbon atoms, based on the weight of polyethylene.

7. A plastic film comprising solid polyethylene and 0.01% to 0.5% by weight of palmitamide.

8. A plastic film comprising solid polyethylene and 0.01% to 0.5% by weight of myristamide.

9. A plastic film comprising solid polyethylene and 0.01% to 0.5% by weight of lauramide.

No references cited.